Jan. 15, 1963 B. McADAMS 3,073,902

MULTICHANNEL COMMUNICATION SYSTEM

Filed May 8, 1957 5 Sheets-Sheet 1

Inventor
BRUCE McADAMS
By Alfred C. Hill
Agent

Jan. 15, 1963 B. McADAMS 3,073,902

MULTICHANNEL COMMUNICATION SYSTEM

Filed May 8, 1957 5 Sheets-Sheet 2

Inventor
BRUCE McADAMS
By Alfred C. Hill
Agent

Jan. 15, 1963 B. McADAMS 3,073,902

MULTICHANNEL COMMUNICATION SYSTEM

Filed May 8, 1957 5 Sheets-Sheet 3

Inventor
BRUCE McADAMS
By Alfred C. Hill
Agent

Inventor
BRUCE McADAMS
By Alfred C. Hill
Agent

Jan. 15, 1963 B. McADAMS 3,073,902

MULTICHANNEL COMMUNICATION SYSTEM

Filed May 8, 1957 5 Sheets-Sheet 5

Inventor
BRUCE McADAMS
By Alfred C. Hill
Agent

United States Patent Office 3,073,902 Patented Jan. 15, 1963

3,073,902

MULTICHANNEL COMMUNICATION SYSTEM

Bruce McAdams, North Arlington, N.J., assignor to International Telephone and Telegraph Corporation, Nutley, N.J., a corporation of Maryland Filed May 8, 1957, Ser. No. 657,937
13 Claims. (Cl. 179—15)

This invention relates to multichannel communication systems and more particularly to a novel arrangement for separating alternate channel signals from a time division multiplex signal wave.

The combining of two time division multiplex signal waves by time-interleaving them to form a single multiplex signal wave is one way of increasing the number of channel signals sent over a transmission path. To reduce the interaction between the resulting multiplex signal waves upon demodulation, it is the practice to separate the transmitted multiplex signal wave into its two component multiplex signal waves at the receiver and couple these separated multiplex signal waves to their respective demodulation terminals for recovery of the intelligence carried by the various channel signals. Heretofore, it has been necessary to provide equipment to generate accurately timed gate pulses to accomplish the desired multiplex signal wave separation. This additional equipment substantially increases the cost of the multiplex communication system and the complexity thereof.

It is an object of this invention to provide a novel arrangement for separating the component time interleaved multiplex signal waves from a received multiplex signal wave including both component multiplex signal waves resulting in relatively small increase in cost and complexity for the multichannel communication system.

Another object in this invention is to provide a novel arrangement for separating alternate channel signals from a time division multiplex signal wave utilizing the timing accuracy of the multiplex signal wave itself to time the separation of the alternate channel signals.

A feature of this invention is the provision of an alternate channel signal separator operating on a signal wave having a plurality of channel signals and a synchronizing signal comprising a switching arrangement having two output circuits coupled to the signal wave and a means to condition said switching arrangement to switch the signals of said signal waves alternately to said output circuits. The means to condition said switching arrangement is coupled to, and the operation thereof timed, by the received multiplex signal waves to pass alternate channel signals to respective ones of the output circuits and is phase controlled by the synchronizing signal of the received multiplex signal wave to assure that the proper alternate channel signals are coupled to the appropriate one of said output circuits.

Another feature of this invention is the provision, in conjunction with the means conditioning the switching arrangement, of a means responsive to the timing of the synchronizing signal to generate timing signals related to the timing of each of the channel signals to continue the cyclic operation of the means conditioning the switching arrangement in the absence of any of the channel signals applied thereto.

Still another feature of this invention is the provision of a pair of gate devices to function as the switching arrangement to alternately switch the channel signals of the signal wave to respective output circuits and of means conditioning the switching arrangement whose operation is timed by the signal wave itself in the form of a flip-flop type multivibrator circuit.

A further feature of this invention is the provision of an arrangement employed to generate the timing signals to maintain the cyclic operation of the means conditioning the switching device in absence of any of the channel signals of the signal wave applied thereto. The timing signal generator includes the application of the resultant master timing signal resulting from the detection of the synchronizing signal to the channel signal separator distributor of each demodulation terminal in a given time relationship to generate timing signals related to the timing of the channel signals of the received multiplex signal wave. The timing signals generated in each of the demodulation terminals are appropriately connected to the flip-flop circuit to maintain the flip-flop operation in proper phase relationship with the timing of the received signal wave in the absence of any of the channel signals applied thereto.

Still a further feature of this invention is still another arrangement to provide the timing signal to maintain the in-phase operation of the flip-flop in case a channel signal is absent. This is accomplished by coupling the channel gate signals of a selected one of the demodulation terminals to a time delay arrangement having two outputs, one of said outputs being time shifted with respect to the other to assure that the resulting trigger pulses are in proper time relationship with the timing of the received channel signals.

The above-mentioned and other features and objects of this invention will become more apparent by reference to the following description taken in conjunction with the accompanying drawings, in which.

Figure 1:
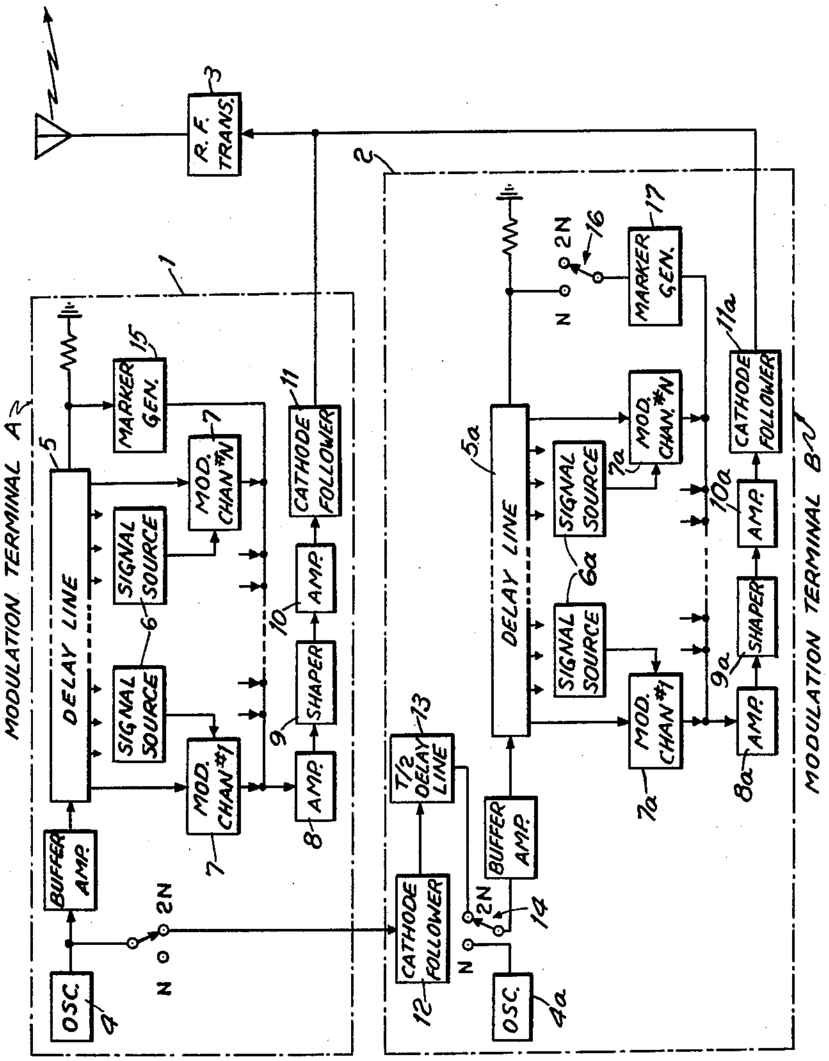
FIG. 1 is a block diagram of the transmission portion of the multichannel communication system to which this invention may be applied.

Referring to FIG. 1, there is illustrated therein transmitting equipment which may be employed with this invention. The transmitting equipment includes two identical N channel signal modulation terminals 1 and 2 and a common radio frequency transmitter 3 for radiation of a signal wave including 2N channel signals. Each of the modulation terminals include a base frequency oscillator 4 driving a delay line distributor 5 having a plurality of output taps therealong equal to N for producing N timing signals for application to N channel modulators 7 of the PTM type. The respective modulation or intelligence signals from sources 6 are applied to their respective channel modulators 7 to provide N pulse time modulated channel signals. The outputs from the channel modulators 7 are coupled in common for time division multiplexing to an amplifier 8, a signal wave shaper 9, an amplifier 10 and a cathode follower 11 for application to the radio frequency transmitter 3.

One way of combining the two N channel pulse trains emanating from modulation terminals 1 and 2 in proper time interleaved relationship is to couple the base frequency signal from oscillator 4 of modulation terminal 1 to drive the delay line distributor *5a* of modulation terminal 2 by means of cathode follower 12 and delay line 13. Thus, modulation terminal 1 functions as the master or control terminal which feeds by means of delay line 13, the base frequency signal, to assure that the pulse train output of modulation terminal 2 has the same base frequency as the output of modulation terminal 1 and by means of delay line 13 is time shifted to permit alternate channel time interleaving between the outputs of modulation terminals 1 and 2. The output of oscillator 4*a* is interrupted by means of switch 14 to prevent it from driving delay line distributor 5*a*. The synchronizing or marker signal for the 2N pulse train output is provided by means of marker generator 15 disposed in terminal 1 and is of the triple pulse type to prevent the generation of false markers by the channel pulses at the receiver end. The marker generator is removed from the slave or modulation terminal 2 by opening switch 16 to deactivate marker generator 17 of terminal 2. Curves A and B of FIG. 3 illustrate the respective channel pulse wave of a cultiplex type produced in each of the terminals 1 and 2 delayed with respect to each other an amount T/2 in delay line 13 where T is equal to the time spacing between adjacent channel signals of the N channel signal wave. Curve C illustrates the interleaved or multiplexed resultant of time division multiplexing the outputs of terminals 1 and 2. The outputs from the two terminal equipments can be mixed directly as illustrated in FIG. 1 or may be mixed through an attenuating pad if this is required. The multiplexed pulse train output is transmitted by transmitter 3 to the receiving terminal illustrated in FIG. 2 to be described hereinbelow.

The multiplexed pulse train of curve C, FIG. 3, transmitted from transmitter 3 is received by radio frequency receiver 18. This received pulse train composed of time interleaved component pulse trains of modulation terminal 1 and modulation terminal 2 is coupled to pulse train separator 19 wherein the component pulse trains are separated for application to their respective demodulation terminals 20 and 21. Demodulation terminals 20 and 21 are identical and of well-known type and include an amplifier 22, a slicer and shaper 23 to shape the pulses coupled thereto. At the output of slicer 23 is coupled an amplifier 24 to couple the pulse train to channel demodulators 25 for separation of the channel signals of the respective channel pulse train coupled thereto by means of the gate signals generated in the delay line distributor 26 which normally is activated by marker detector 27, shaper 28 and the delay line driver 29. When the channel signal is separated from the pulse train by demodulators 25, it is simultaneously demodulated to recover the intelligence carried thereby. The recovered intelligence is then coupled to a utilization device 30.

For normal N channel operation, switches 31 and 32 would be closed in the N position, but for the 2N operation, the switches 31 and 32 will be positioned as indicated in the drawing to respectively receive the separated pulse train and the detected marker pulse from pulse train separator 19.

In decombining, the 2N pulse train of curve C, FIG. 3, the only factor that identified which of the two component pulse trains a particular pulse belongs to is the time at which the pulse occurs. Basically the pulse train separator 19 includes a switching arrangement 33 having two outputs 34 and 35 and a means to condition the switching arrangement 33 identified as 36. This means to condition switching arrangement 33 includes a means to operate on switching arrangement 33 to switch the signals of the received pulse train alternately to the output circuits 34 and 35 for coupling the component pulse trains to their respective demodulation terminals. The timing of the operation of means 36 is accomplished by coupling the received pulse train to means 36 and utilizing the timing of the channel signals of the pulse train to activate means 36 for conditioning switching arrangement 33 to pass alternate channel pulses of the pulse train to respective ones of the output circuits and thereby couple the component pulse trains to their respective demodulation terminals. The means 36 is further phased or controlled by detection of the synchronizing pulse and applying the synchronizing pulse or signal to means 36 to assure that the proper alternate channel signals are coupled to the appropriate one of the output circuits and hence to their respective demodulation terminals, in other words, to phase or frame the operation of means 36. The switching arrangement illustrated includes gating devices 37 and 38 coupled in parallel to the output of receiver 18 by means of delay line 39. Means 36 is a flip-flop type circuit 40 to alternately turn the gate tubes 37 and 38 on and off. The 2N channel pulse train from receiver 18 is coupled through amplifier 41 to flip-flop 40 to provide the timing for flip-flop 40 to switch the gating tubes on and off for separation of alternate channel pulses of the 2N pulse train and hence the separation of the component pulse trains for application over output lines 34 and 35 to their respective demodulation terminals 20 and 21. The delay line 39 delays the input pulse train sufficiently long to cover the transition of the flip-flop. The delay imparted by delay line 39, time *t*, is illustrated in curve D, FIG. 3.

Curve H, FIG. 3, illustrates the output of flip-flop 40 to gate 38 which is produced by the A pulses of curve C triggering one side of flip-flop 40 off and the B pulses of curve C triggering the other side of flip-flop 40 off or said one side of flip-flop 40 on. Curve I, FIG. 3, illustrates the output of flip-flop 40 to gate 38 which is produced by the reversing triggering action of the A and B pulses of curve C. The dotted portions of curves A, B, C, D, H, I, J and K represent the modulation swing of the channels of the pulse trains. Curves J and K represent the output of gates 37 and 38 and also the resultant pulse train separation from the multiplexed pulse train as represented by curve D, FIG. 3.

The one marker pulse identified as M in curves A, B, and C, FIG. 3, is detected in marker detector 42 of pulse train separator 19 before the pulse trains are separated. This detected marker or synchronizing signal, as illustrated in curve F, FIG. 3, is coupled to flip-flop 40 and is used to frame or properly phase flip-flop 40 to assure that the proper alternate channel signals of the received multiplex signal wave are coupled to their respective demodulation terminals through gates 37 and 38. The same detected marker signal is also coupled to demodulation terminals 20 and 21. As illustrated, the detected marker signal is coupled directly to demodulation terminal 20 to switch 32 and to demodulation terminal 21 through delay line 43 to switch 32*a*. The detected marker that occurs in separator 19 is utilized to time the operation of these demodulation terminals for channel separation and demodulation of the respective pulse trains applied thereto and further provides a time delay shift of $T/2$ in delay line 43 to the marker applied to demodulation terminal 21. The reason for this pulse shift will become apparent as the description of the operation of pulse train separator 19 is continued.

It will be recognized that various channel pulses or signals in any order whatsoever may be missing from the component pulse trains and hence from the multiplex pulse train received at receiver 18. This may be due to many reasons which will include the incorporation of drop and insert equipment prior to the receiving equipment. This is depicted in the curves of FIG. 3 by showing the channel signal of channel 4 at the output of terminal 1 missing and channel 2 at the output of terminal 2 missing. These channel signals will likewise be missing in the multiplex pulse train received at receiver 18. If an arrangement was not provided to account or compensate for these missing channel signals, flip-flop 40 would become out of phase with respect to channel signals of the received pulse train and hence the proper alternate channel separation would not occur.

Figure 2:
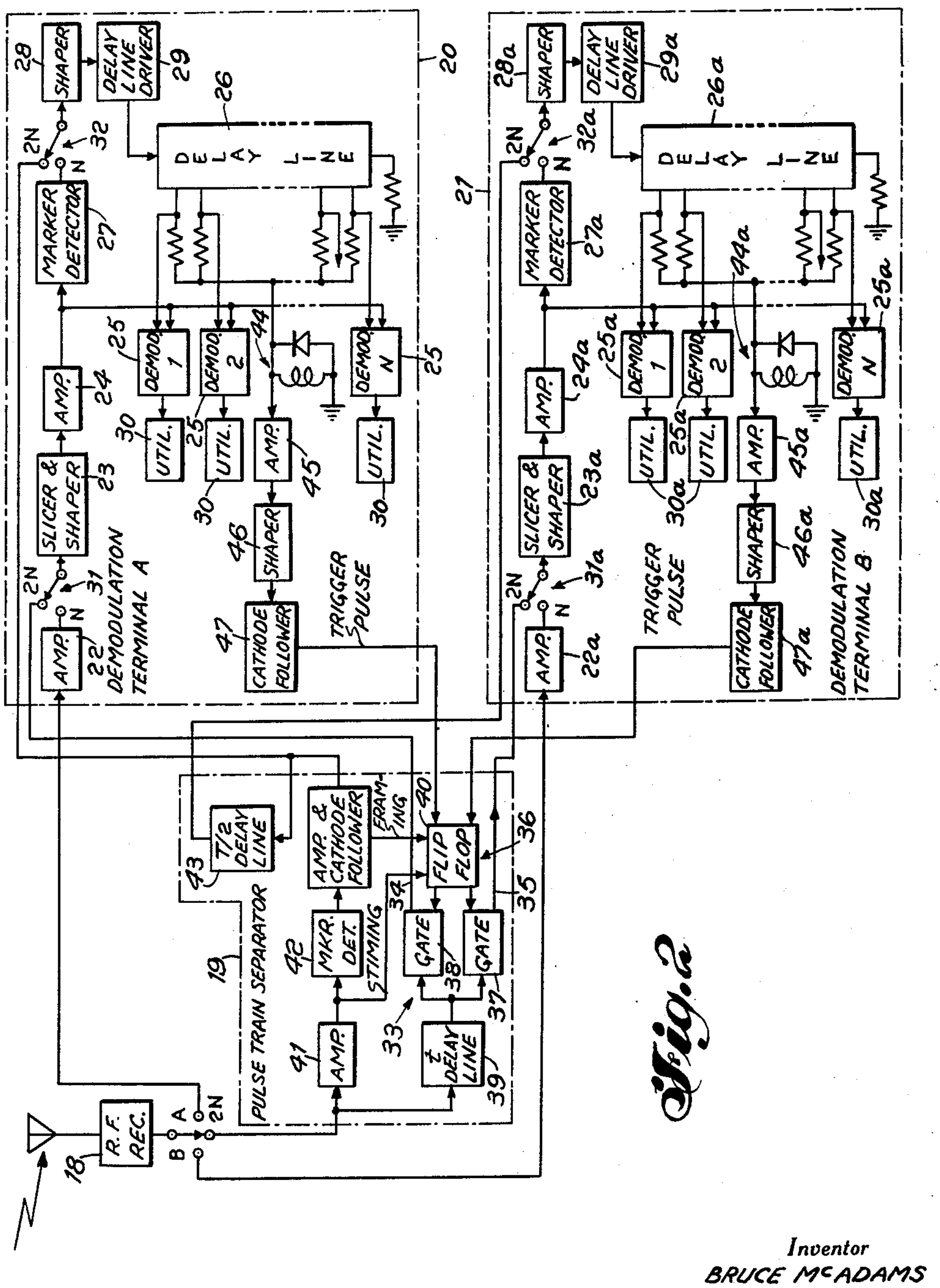
FIG. 2 is a block diagram of the receiving portion of a multichannel communication system employing the pulse train separator in accordance with the principles of this invention.
Figure 3:
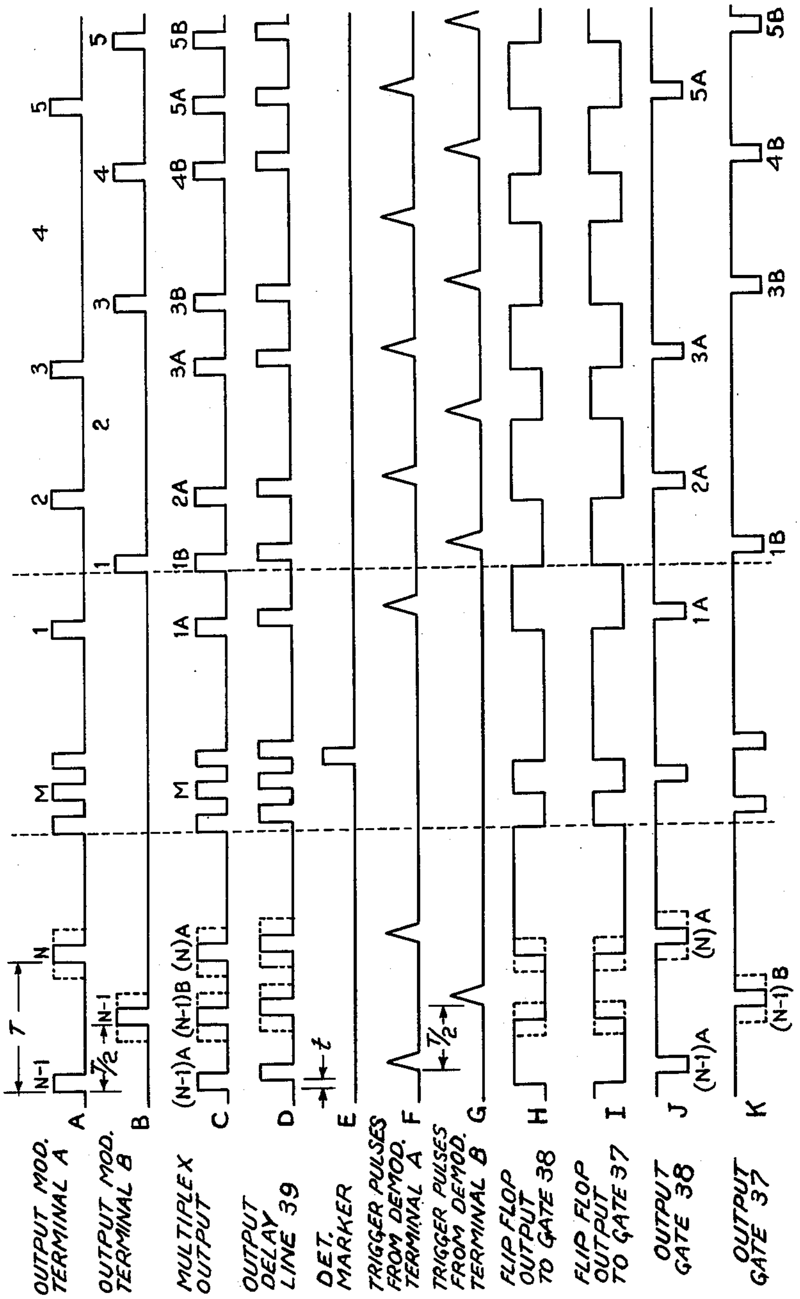
FIG. 3 is a timing diagram useful in explaining the operation of the pulse train separator of this invention.

One embodiment is shown in FIG. 2 to compensate for these missing channel signals. In each of the demodulation terminals 20 and 21 there is provided an output taken from each tap of the delay line distributors 26 and 26a, respectively. These outputs from the taps of the delay line distributors are coupled in common to a differentiator 44. This gives a source of trigger pulses from demodulation terminal 20 which is related to the timing of the pulses of the pulse train coupled to demodulation terminal 20 as illustrated in curve F, FIG. 3. The output of differentiator 44a will give a source of trigger pulses related in time to the channel signals of the pulse train coupled to demodulation terminal 21 and delayed an amount $T/2$ from the trigger pulse of terminal 20 equivalent to the time delay imparted to the detected marker in delay line 43, as illustrated in curve G, FIG. 3. Thus, the delay of delay line 43 shifts the trigger pulses at the output of differentiator 44a to properly position these trigger pulses with respect to the channel pulses of its respective pulse train. These trigger pulses are then amplified in amplifier 45, shaped in shaper 46 and applied through a cathode follower 47 to flip-flop 40 and are phased to arrive just after the latest possible time for the corresponding channel pulse. The appearance of the trigger pulses from the demodulation terminals 20 and 21 has no effect on flip-flop 40 when a channel pulse has already triggered the flip-flop 40 for activation of the gates 37 and 38. However, if a channel pulse is missing, the trigger pulse from the demodulation equipment triggers flip-flop 40 and keeps it operating at a proper cyclic operation or hence at a proper phase. There is no rigid time requirement on the trigger pulses from the respective demodulation terminals as these pulses may occur at any time after the corresponding channel pulse and before the next channel pulse.

The amplifiers 22 and 22a of the respective demodulation terminals 20 and 21 may be dropped out of service as indicated by the position of switches 31 and 31a since the gating devices 37 and 38 added in series wtih the respective demodulation terminals amplifies and inverts the channel pulses for 2N channel operation.

Figure 4:
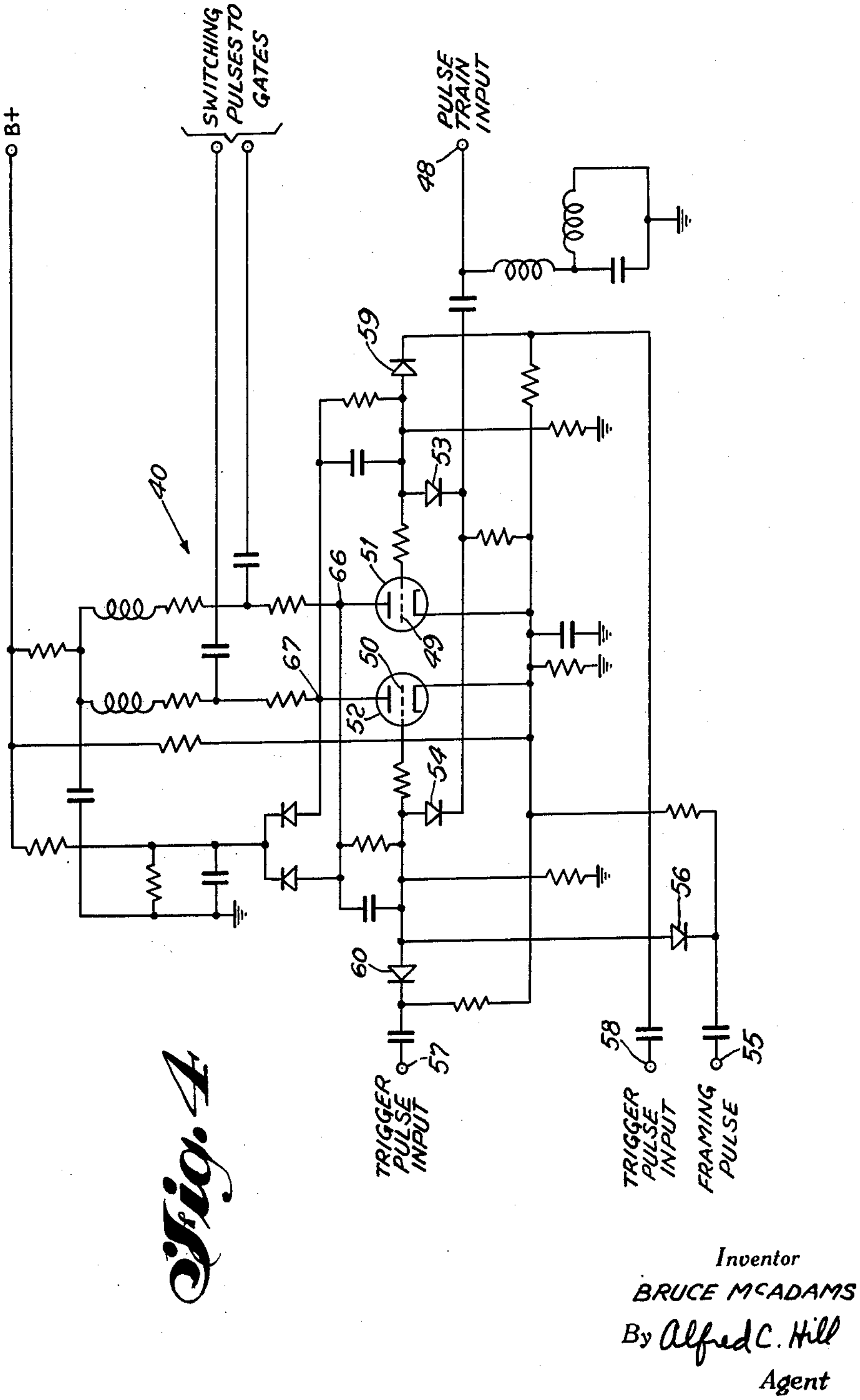
FIG. 4 is a schematic diagram of the flip-flop multivibrator circuit employed in the pulse train separator of FIG. 2.

Referring to FIG. 4, there is illustrated therein a schematic diagram of a flip-flop circuit which will carry out the functions required of flip-flop 40. The flip-flop 40, as illustrated in FIG. 4, is a relatively well-known flip-flop circuit and the specific circuit components thereof will not be dealt with in detail. However, the application of the various signals to the flip-flop circuit of FIG. 4 will be discussed. The pulse train which times the operation of the flip-flop 40 curve C, FIG. 3, is coupled from amplifier 41, FIG. 2, to terminal 48, FIG. 4, and hence to the grids 49 and 50 of tubes 51 and 52 through diodes 53 and 54 which are appropriately biased by the resistors associated therewith to enable the pulses of pulse train to trigger the flip-flop when they occur on the appropriate grid of the tubes 51 and 52. The framing pulse from marker detector 42, FIG. 2, is coupled to terminal 55, FIG. 4, and applied to grid 50 of tube 52 through means of diode 56. As stated before, the operation of this framing pulse is to phase the operation of the flip-flop 40 with respect to the received multiplex signal. The trigger pulses to assure the proper phasing of the flip-flop 40 with respect to the channel signal when one or more channel signals are absent are coupled from demodulation terminals 20 and 21 to terminals 57 and 58 for application to the respective grids of tubes 51 and 52 through means of diodes 59 and 60, respectively.

It will be observed that all the pulse inputs to flip-flop 40 are through diodes. These diodes operate to prevent the trigger pulses and the framing pulse from affecting the operation of the flip-flop as long as the pulse train is in proper phase and the channel pulses are present and to prevent interaction between the various pulse sources. This is accomplished as follows.

Let us assume that tube 51 is conducting and tube 52 is non-conducting. This means that point 66 in the anode circuit of tube 51 is at a low potential, and point 67 in the anode circuit of tube 52 is at a relatively high potential, approximately B+. Diodes 54, 56 and 60 have the low potential from point 66 on their anodes and diodes 53 and 59 have the high potential from point 67 on their anodes. Now, if the negative pulses of the pulse train are applied to the cathode of diodes 53 and 54, the bias is such on these diodes that the negative pulse will not pass through diode 53 but will be conducted through diode 54. This will cause tube 52 to become conductive and tube 51 to become non-conductive and will reverse the polarity at points 66 and 67. The trigger pulse is applied and finds a high potential from point 66 and thus will have no effect on the circuit. However, if the channel pulse did not appear when tube 52 was non-conductive, the conduction conditions of tubes 51 and 52 would not have been reversed and the trigger pulse would be passed through diode 60 to cause the conduction conditions of tubes 51 and 52 to reverse. The same action occurs with the framing pulse at terminal 55. After the reversal of the conduction conditions of tubes 51 and 52, the next channel pulse at terminal 48 will be passed through diode 53 to again flip the conduction conditions if it is present. If the channel pulse is not present, the trigger pulse will be passed through diode 59 to effect the conduction condition reversal. If the channel pulse is present, the reversal of conduction condition will bias diode 59 so that the trigger pulse will have no effect. This action keeps the flip-flop 40 operating cyclically and in proper phase relationship with the received pulse train to accomplish the desired switching of alternate channel pulses of the received pulse train to their respective demodulation terminals.

Figure 5:
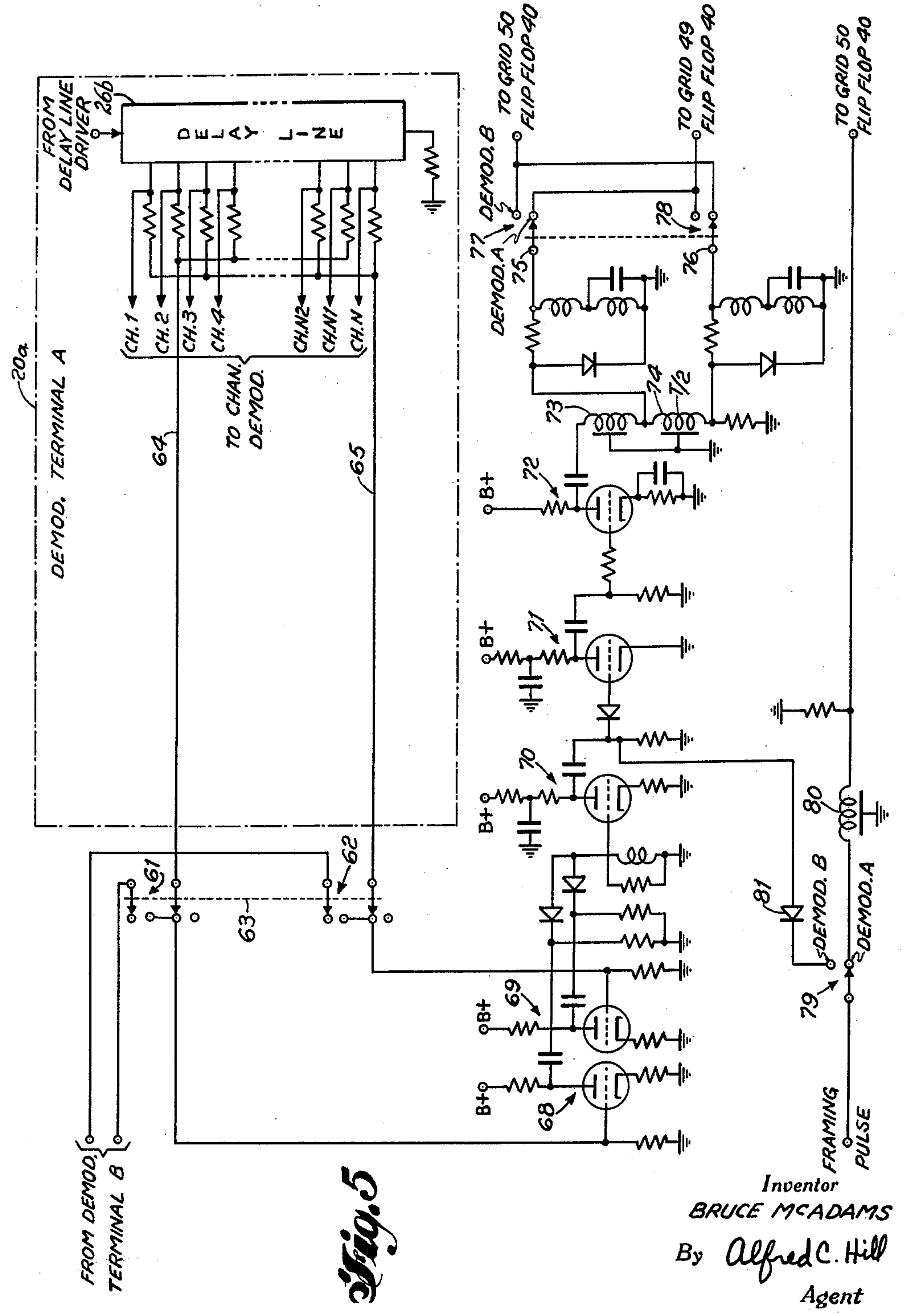
FIG. 5 is a block diagram of another embodiment, partially in schematic form for generating the trigger pulses employed to maintain the operation of the flip-flop of FIG. 2 in phase.

In FIG. 2 there is illustrated one arrangement for generating the necessary trigger pulses to prevent the out-of-phase operation of the flip-flop 40 in the event of a missing channel signal. FIG. 5 illustrates still another arrangement for deriving trigger pulses like those of curves F and G, FIG. 3, having a time relationship with respect to the channel pulses of the received pulse train. Each of the demodulation terminals 20 and 21 would have the same arrangement as shown in detail for terminals 20a and the timing signal output of one of the terminals is selected by means of switches 61 and 62 which are ganged together as illustrated by the dotted lines 63. As illustrated in terminal 20a, the output taps of delay line distributor 26b are alternately connected to bus connections. In other words, the output for channels 1, 3, 5 and 7 and so forth for the other odd channel gates are connected to a common output connection 64 and the gates for channels 2, 4, 6 and the other even channel gates are connected to a common output connection 65. Each of these outputs from the terminal 20a has strong components at the repetition frequency of the channel pulses of the respective pulse trains of the terminals, or the component pulse trains of the received multiplexed pulse train. The separation of these two outputs is to enable the development of a sharp timing pulse from a system where the gates occupy the entire channel interval and thereby would result in a continuous wave rather than an interrupted wave. The odd and even outputs of the delay line 26b are coupled to shapers 68, 69, 70, 71 and 72, where they are shaped, differentiated, amplified and interleaved in time to provide a trigger pulse train as shown in curve F or G, FIG. 3, depending upon the terminal from which the timing signals are derived. The output of shaper 72 is coupled to delay lines 73 and 74 connected in series. The delay of delay line 73 is such that proper phasing occurs between the trigger pulses and the received pulse train. An output is taken from the end of delay line 73 and applied to terminal 75 of switch 77. The delay of delay line 74 equal to $T/2$ is such that the trigger pulse train is shifted to a desired time relationship with the other component pulse train of the received pulse train. The output of this delay line is coupled to terminal 76 of switch 78. Ganged switches 77 and 78 enable the application of the trigger pulses on the appropriate grid of flip-flop 40 to provide the proper time relationship between the trigger pulses and the received pulse train. If the timing signal is derived from terminal 20*a* switches 77 and 78 would be positioned as shown. Thus, the trigger pulses at terminal 75 would be applied to grid 49 of flip-flop 40, FIG. 4, and the trigger pulses at terminal 76 would be applied to grid 50 of flip-flop 40. However, if the timing signal is derived from terminal B which is delayed in time $T/2$ from the timing signal of terminal 20*a*, switches 77 and 78 would be placed at the other switch position. Thus, the trigger pulses at terminal 75 would be applied to grid 50 of flip-flop 40 and the trigger pulses at terminal 76 would be applied to grid 49 of flip-flop 40 thereby providing the proper time relationship between the trigger pulses and the channel pulses of the received pulse train for separation of the component pulse train therefrom for application to the proper demodulation terminal. A switch 79 is necessary for operation in conjunction with switches 77 and 78 to assure the proper timing of the framing pulse with respect to the triggering pulse. As illustrated, the frame pulse is coupled through delay line 80 to grid 50 of flip-flop 40 directly when the timing pulses emanate from demodulation terminal 20*a*. The delay line 80 is used to assure proper phasing of the framing pulse with the received pulse train. When the timing pulses emanate from demodulator B, the switch 79 would be placed in the other position, and the framing pulse is coupled through diode 81 to shaper 71 and applied along with the trigger pulses to their respective grids of flip-flop 40.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal separator comprising a source of signals including at least four channel signals and a synchronizing signal, a switching arrangement having two output circuits, a first signal path coupling the signals of said source to said switching arrangement, a means to condition said switching arrangement to switch the signals of said source alternately to said output circuits, a second signal path coupling the signals of said source to said conditioning means for activation thereof in accordance with the timing of said channel signals to condition said switching arrangement to pass alternate channel signals of said four channel signals to respective ones of said output circuits, and means coupled to said source responsive to said synchronizing signal to control said conditioning means to assure that the proper alternate channel signals are coupled to the appropriate one of said output circuits.

2. A signal separator comprising a source of signals including at least four channel signals and a synchronizing signal, a pair of switching devices, a pair of utilization devices, a first signal path coupling the signals of said source to each of said switching devices, a conditioning means to alternately change the condition of said switching devices, a second signal path coupling the signals of said source to said conditioning means for activation thereof in accordance with the timing of said channel signals to condition said switching devices to pass alternate channel signals of said four channel signals to the appropriate one of said utilization devices, and means coupled to said source responsive to said synchronizing signal to control said conditioning means to assure that the proper alternate channel signals are switched in said switching devices to the appropriate one of said utilization devices.

3. A signal separator comprising a source of signals including a plurality of channel signals and a synchronizing signal, a switching arrangement having two output circuits, a multichannel signal demodulator coupled to each of said output circuits, a first signal path coupling the signals of said source to said switching arrangement, a means to condition said switching arrangement to switch the signals of said source alternately to said output circuits, a second signal path coupling the signals of said source to said conditioning means for activation thereof to condition said switching arrangement to pass alternate channel signals of said plurality of channel signals to respective ones of said output circuits for application to the appropriate one of said demodulators, and means coupled to said source responsive to said synchronizing signal to control said conditioning means to assure that the proper alternate channel signals are coupled to the appropriate one of said demodulators.

4. A signal separator comprising a source of signals including a plurality of channel signals and a synchronizing signal, a switching arrangement having two output circuits, a first signal path coupling the signals of said source to said switching arrangement, a means to condition said switching arrangement to switch the signals of said source alternately to said output circuits, a second signal path coupling the signals of said source to said conditioning means for activation thereof to condition said switching arrangement to pass alternate channel signals of said plurality of channel signals to respective ones of said output circuits, means coupled to said source responsive to the timing of said synchronizing signal to generate timing signals related to the timing of each of said channel signals and means to couple said timing signals to said conditioning means to continue the cyclic operation thereof in the absence of the channel signal related to said timing signals.

5. A signal separator comprising a source of signals including a plurality of channel signals and a synchronizing signal, a switching arrangement having two output circuits, a signal demodulation terminal coupled to each of said output circuits, a first signal path coupling the signals of said source to said switching arrangement, a means to condition said switching arrangement to switch the signals of said source alternately to said output circuits, a second signal path coupling the signals of said source to said conditioning means for activation thereof to condition said switching arrangement to pass alternate channel signals of said plurality of channel signals to respective ones of said output circuits for application to the appropriate one of said demodulation terminals, means to couple said synchronizing signal from said source to each of said demodulation terminals, each of said demodulation terminals including means responsive to said synchronizing signal to generate timing signals related to the timing of each of said channel signals coupled thereto, and means to couple the timing signals of at least one of said demodulation terminals to said conditioning means to continue the cyclic operation thereof in the absence of the channel signal related to said timing signals.

6. A signal separator comprising a source of signals including a plurality of channel signals and a synchronizing signal, a switching arrangement having two output circuits, a signal demodulation terminal coupled to each of said output circuits, a first signal path coupling the signals of said source to said switching arrangement, a means to condition said switching arrangement to switch the signals of said source alternately to said output circuits, a second signal path coupling the signals of said source to said conditioning means for activation thereof to condition said switching arrangement to pass alternate channel signals of said plurality of channel signals to respective ones of said output circuits for application to the appropriate one of said demodulation terminals, means to couple said synchronizing signal from said source to each of said demodulation terminals, each of said demodulation terminals including means responsive to said synchronizing signal to generate timing signals related to the timing of each of said channel signals coupled thereto, and means to couple the timing signals of each of said demodulation terminals to said conditioning means to continue the cyclic operation thereof in the absence of the channel signal related to said timing signal.

7. A signal separator comprising a source of signals including a plurality of channel signals and a synchronizing signal, a switching arrangement having two output circuits, a signal demodulation terminal coupled to each of said output circuits, a first signal path coupling signals of said source to said switching arrangement, a means to condition said switching arrangement to switch the signals of said source alternately to said output circuits, a second signal path coupling the signals of said source to said conditioning means for activation thereof to condition said switching arrangement to pass alternate channel signals of said plurality of channel signals to respective ones of said output circuits for application to the appropriate one of said demodulation terminals, means to couple said synchronizing signal from said source to each of said demodulation terminals, each of said demodulation terminals including means responsive to said synchronizing signal to generate timing signals, a delay device having two outputs spaced in time equivalent to the spacing between adjacent channel signals of said plurality of channel signals to relate the timing of said timing signals to each of said channel signals, means to selectively couple the timing signals of one of said demodulation terminals to said delay device and means to couple the two outputs of said delay device appropriately to said conditioning means to continue the cyclic operation thereof in the absence of the channel signals related to said timing signals.

8. A signal separator comprising a source of signals including at least four channel signals and a synchronizing signal, a pair of gate circuits, a first signal path coupling the signals of said source to each of said gate circuits, a single flip-flop coupled to both of said gate circuits to alternately change the conduction condition of said gate circuits, a second signal path coupling the signals of said source to said flip-flop for timing thereof to condition said gate circuits to pass alternate channel signals of said four channel signals and means coupled to said source responsive to said synchronizing signal to control said flip-flop to assure that the proper alternate channel signals are passed through said gate circuits.

9. A signal separator comprising a source of signals including a plurality of channel signals and a synchronizing signal, a pair of gate circuits, a first signal path coupling the signals of said source to each of said gate circuits, a flip-flop circuit to alternately change the conduction condition of said gate circuits, a second signal path coupling the signals of said source to each side of said flip-flop circuit for timing thereof to condition said gate circuits to pass alternate channel signals of said plurality of channel signals, means coupled to said source responsive to said synchronizing signal to control said flip-flop circuit to assure that the proper alternate channels signals are passed through said gate circuits, means coupled to said source responsive to the timing of said synchronizing signal to generate two groups of timing signals, one of said groups of timing signals related to the timing of the odd channel signals of said plurality of said channel signals and the other of said groups of timing signals related to the timing of the even channel signals of said plurality of said channel signals, and means to couple said one of said groups of said timing signals to one side of said flip-flop circuit and said other of said groups of timing signals to the other side of said flip-flop circuit to continue the cyclic operation thereof in the absence of a channel signal related to individual ones of said timing signals.

10. A signal separator comprising a source of multichannel signals including a plurality of odd channel signals, a plurality of even channel signals and a synchronizing signal, a pair of gate circuits, a first signal path coupling the signals of said source to each of said gate circuits, an odd channel signal demodulation terminal coupled to one of said gate circuits, an even channel signal demodulation terminal coupled to the other of said gate circuits, a flip-flop circuit to alternately change the conduction condition of said gate circuits, a second signal path coupling the signals of said source to each side of said flip-flop circuit for timing thereof to condition said gate circuits to pass said odd channel signals to said odd channel signal demodulation terminal and said even channel signals to said even channel signal demodulation terminal and means coupled to said source responsive to said synchronizing signal to control the cyclic operation of said flip-flop circuit for proper phase relationship with the signals of said source.

11. A signal separator comprising a source of multichannel signals including a plurality of odd channel signals, a plurality of even channel signals and a synchronizing signal, a pair of gate circuits, a first signal path coupling the signals of said source to each of said gate circuits, an odd channel signal demodulation terminal including a timing signal distributor coupled to one of said gate circuits, an even channel signal demodulation terminal including a timing signal distributor coupled to the other of said gate circuits, a flip-flop circuit to alternately change the conduction condition of said gate circuits, a second signal path coupling the signals of said source to each side of said flip-flop circuit for timing thereof to condition said gate circuits to pass said odd channel signals to said odd channel signal demodulation terminal and said even channel signals to said even channel signal demodulation terminal, a synchronizing signal detector coupled to said source to detect said synchronizing signal and provide a master timing signal, means coupling said master timing signal to said flip-flop circuit for phase adjustment thereof, means coupling said master timing signal directly to the timing signal distributor of said odd channel signal demodulation terminal, delay means coupling said master timing signal to the timing signal distributor of said even channel signal demodulation terminal, means coupled in common to the output taps of said odd channel distributor to produce trigger pulses related to the timing of said odd channel signals, means coupled in common to the output taps of said even channel distributor to produce trigger pulses related to the timing of said even channel signals and means coupling said even channel and said odd channel trigger pulses separately to the appropriate side of said flip-flop to continue the cyclic operation thereof in the absence of the channel signal related to individual ones of the trigger pulses.

12. A signal separator comprising a source of multichannel signals including a plurality of odd channel signals, a plurality of even channel signals and a synchronizing signal, a pair of gate circuits, a first signal path coupling the signals of said source to each of said gate circuits, an odd channel signal demodulation terminal including a timing signal distributor coupled to one of said gate circuits, an even channel signal demodulation terminal including a timing signal distributor coupled to the other of said gate circuits, a flip-flop circuit to alternately change the conduction condition of said gate circuits, a second signal path coupling the signals of said source to each side of said flip-flop circuit for timing thereof to condition said gate circuits to pass said odd channel signals to said odd channel signal demodulation terminal and said even channel signals to said even channel signal demodulation terminal, a synchronizing signal detector coupled to said source to detect said synchronizing signal and provide a master timing signal, means coupling said master timing signal to said flip-flop circuit for phase adjustment thereof, means coupling said master timing signal to the timing signal distributor of each of said demodulation terminals, means coupled to the output taps of each of the distributors of said terminals to produce timing signals, time delay means selectively coupled to said terminals to produce from the selected timing signals of one of said terminals a first train of trigger signals related in time to said odd channel signals and a second train of trigger signals related in time to said even channel signals and means coupling said first and second train of trigger signals separately to the appropriate side of said flip-flop to continue the cyclic operation thereof in the absence of the channel signal related to the individual ones of the trigger pulses.

13. A signal separator comprising a source of signals including at least four channel signals and a synchronizing signal, a switching arrangement having two output circuits, a first signal path coupling the signals of said source to said switching arrangement, a means to condition said switching arrangement to switch the signals of said source alternately to said output circuits, a second signal path coupling the signals of said source to said conditioning means for activation thereof in accordance with the timing of said channel signals to condition said switching arrangement to pass alternate channel signals of said four channel signals to respective ones of said output circuit, and means separate from said first and second signal paths coupled to said source responsive to said synchronizing signal to control said conditioning means to assure that the proper alternate channel signals are coupled to the appropriate one of said output circuits.

References Cited in the file of this patent

UNITED STATES PATENTS

| | | |
|---|---|---|
| 2,252,599 | Lewis | Aug. 12, 1941 |
| 2,462,100 | Hollabaugh | Feb. 22, 1949 |
| 2,498,678 | Grieg | Feb. 28, 1950 |
| 2,527,638 | Kreer et al. | Oct. 31, 1950 |
| 2,527,649 | Peterson | Oct. 31, 1950 |
| 2,527,650 | Peterson | Oct. 31, 1950 |
| 2,546,316 | Peterson | Mar. 27, 1951 |
| 2,554,112 | Libois | May 22, 1951 |
| 2,601,289 | Hollabaugh | June 24, 1952 |
| 2,812,435 | Lyon | Nov. 5, 1957 |
| 2,816,168 | Morris et al. | Dec. 10, 1957 |
| 2,827,516 | Morris | Mar. 18, 1958 |
| 2,912,506 | Hughes | Nov. 10, 1959 |